(12) United States Patent
Arora et al.

(10) Patent No.: US 12,647,354 B2
(45) Date of Patent: Jun. 2, 2026

(54) ENHANCED BORDER GATEWAY PROTOCOL (BGP) AND/OR INTERIOR GATEWAY PROTOCOL (IGP) FOR ENVIRONMENTALLY SUSTAINABLE ROUTING OVER THE INTERNET

(71) Applicant: Cisco Technology, Inc., San Jose, CA (US)

(72) Inventors: Ankush Ganpatrai Arora, Mumbai (IN); Vinay Saini, Bangalore (IN); Atahar Khan, Bangalore (IN); Ganesh Ramalingam Chelliah, Westmead (AU)

(73) Assignee: Cisco Technology, Inc., San Jose, CA (US)

( * ) Notice: Subject to any disclaimer, the term of this patent is extended or adjusted under 35 U.S.C. 154(b) by 280 days.

(21) Appl. No.: 18/592,290

(22) Filed: Feb. 29, 2024

(65) Prior Publication Data

US 2025/0279959 A1 Sep. 4, 2025

(51) Int. Cl.
*H04L 45/00* (2022.01)
*H04L 45/02* (2022.01)

(52) U.S. Cl.
CPC .............. *H04L 45/34* (2013.01); *H04L 45/04* (2013.01)

(58) Field of Classification Search
None
See application file for complete search history.

(56) References Cited

U.S. PATENT DOCUMENTS

| | | | | |
|---|---|---|---|---|
| 8,885,463 | B1 * | 11/2014 | Medved | H04L 45/50 |
| | | | | 709/224 |
| 10,110,479 | B1 * | 10/2018 | Ramachandran | H04L 45/46 |
| 2006/0198308 | A1 * | 9/2006 | Vasseur | H04L 67/51 |
| | | | | 370/465 |

(Continued)

FOREIGN PATENT DOCUMENTS

CN 105580331 A * 5/2016 .............. H04L 45/12

OTHER PUBLICATIONS

Raman S., et al., "Reducing Power Consumption using BGP Path Selection", Choosing best paths in BGP based on Power Metrics, PANET Working Group, Mar. 24, 2013, 26 pages.

*Primary Examiner* — Phyllis A Book
(74) *Attorney, Agent, or Firm* — Polsinelli P.C.

(57) ABSTRACT

A system and method are provided for using a green score to improve environmental sustainability for routing traffic between and or/within autonomous systems (ASs). Node-level green scores are calculated based on environmental information of the nodes (e.g., locations, router type and electrical consumption, and location-dependent environmental impact of electrical production), and AS-level green scores are based on the node-level green score from the respective ASs. For intra-AS routing, node and adjacency labels are pushed to a headend path computation element client (PCC), and the label switched path (LSP) is determined based on the node-level green scores and the node and adjacency labels. For inter-AS routing, the AS having a better AS-level green score is preferred, when the routes through the respective ASs are equal-cost multi-path (Continued)

(ECMP) routes. Exit nodes between ASs are selected based on the node-level green scores.

20 Claims, 8 Drawing Sheets

(56) References Cited

U.S. PATENT DOCUMENTS

| | | | | |
|---|---|---|---|---|
| 2007/0047469 | A1* | 3/2007 | Vasseur | H04L 45/028 |
| | | | | 370/255 |
| 2010/0208741 | A1* | 8/2010 | Vasseur | H04L 45/02 |
| | | | | 370/400 |
| 2013/0336107 | A1* | 12/2013 | Vasseur | H04L 41/0654 |
| | | | | 370/218 |
| 2013/0336109 | A1* | 12/2013 | Previdi | H04L 43/16 |
| | | | | 370/254 |
| 2013/0336116 | A1* | 12/2013 | Vasseur | H04L 45/125 |
| | | | | 370/235 |
| 2013/0336126 | A1* | 12/2013 | Vasseur | H04L 41/147 |
| | | | | 370/235 |
| 2014/0192677 | A1 | 7/2014 | Chew et al. | |
| 2015/0089081 | A1* | 3/2015 | Thubert | H04W 40/30 |
| | | | | 709/239 |
| 2016/0226757 | A1 | 8/2016 | Dharmadhikari et al. | |
| 2021/0111994 | A1 | 4/2021 | Li et al. | |
| 2021/0168070 | A1* | 6/2021 | Zhao | H04L 45/028 |
| 2023/0239211 | A1* | 7/2023 | Palmero | H04L 41/0833 |
| 2023/0261967 | A1 | 8/2023 | Padi et al. | |
| 2024/0333591 | A1* | 10/2024 | Pignataro | H04L 41/0833 |

* cited by examiner

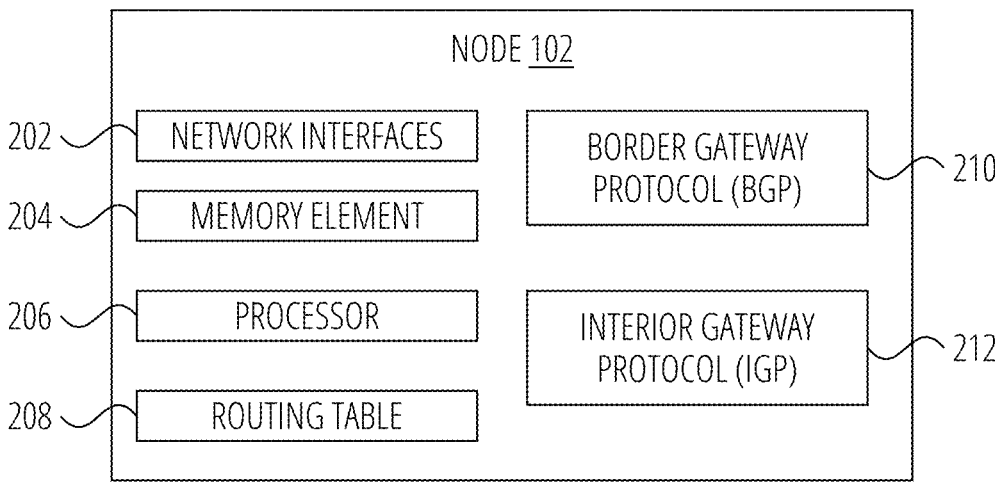
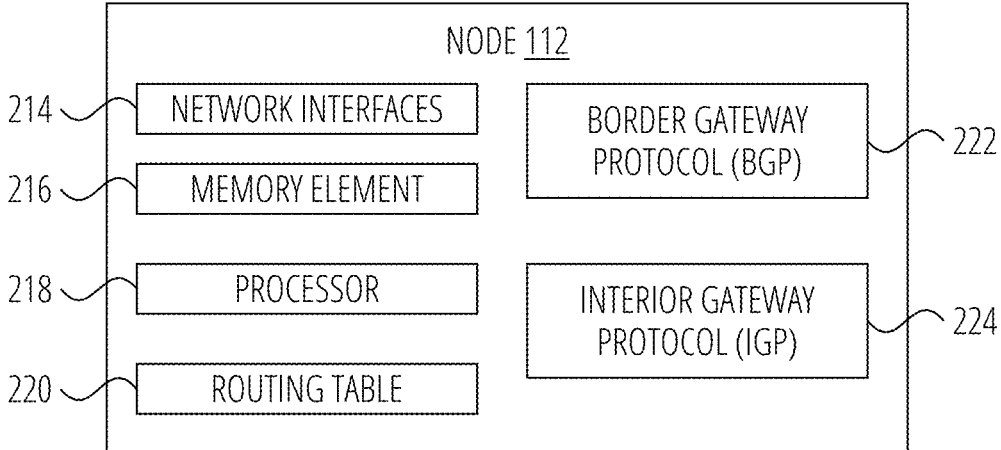
FIG. 2

700

DETERMINE GREEN SCORES, E.G., BASED ON LOCATIONS OF NODES, THE ENERGY EFFICIENCY OF THE NODE ROUTER, AND ENERGY-PRODUCTION INFORMATION (E.G., A $CO_2$ EMISSIONS MAP) 702

DETERMINE INTRA-AS ROUTES BY PUSHING NODE AND ADJACENCY LABELS TO HEADEND ELEMENT, AND ANALYZE CANDIDATE ROUTES BASED ON THEIR CORRESPONDING GREEN SCORES AND POSSIBLY OTHER CONSIDERATIONS 704

ROUTE, FOR INTRA-AS TRAFFIC, DATA PACKETS ALONG THE DETERMINED OPTIMAL PATH (E.G., OPTIMAL ECOLOGICAL PATH). 706

APPLY GREEN SCORES TO DETERMINE PREFERRED EXIT NODES FOR LINKS BETWEEN AUTONOMOUS SYSTEMS, AND DIRECT INTER-AS COMMUNICATIONS ALONG THE PREFERRED INTER-AS LINKS 708

DETERMINE AS-LEVEL GREEN SCORES BASED ON THE GREEN SCORES (I.E., NODE-LEVEL GREEN SCORES), AND APPLY AS-LEVEL GREEN SCORES TO DETERMINE PREFERRED AUTONOMOUS SYSTEMS, AND DIRECT INTER-AS COMMUNICATIONS THROUGH THE PREFERRED AUTONOMOUS SYSTEMS 710

FIG. 7

ENHANCED BORDER GATEWAY PROTOCOL (BGP) AND/OR INTERIOR GATEWAY PROTOCOL (IGP) FOR ENVIRONMENTALLY SUSTAINABLE ROUTING OVER THE INTERNET

BACKGROUND

In computer networking, a significant concern is how to best route traffic flows from one end point to another end point across a network. Routers may be used in an autonomous system (AS) to determine a node to which network traffic propagating through the autonomous system should be forwarded. Routers communicate with other routers within the autonomous system to determine the best paths through the autonomous system to reach a destination address. Various protocols may be used including Border Gateway Protocol (BGP), which is used for routing between autonomous systems, and Internal Border Gateway Protocol (iBGP), which is used for routing between routers in the same autonomous system to external destinations. An Interior Gateway Protocol (IGP) is used for routing inside an autonomous system to internal destinations. Generally, routing decisions are made independently of environmental considerations.

Sustainability within internet protocol (IP) networking involves the approach of constructing, deploying, and sustaining network structures and services to reduce environmental harm, optimize resource utilization, and ensure long-term sustainability. The existing IGP (Interior Gateway Protocol) and BGP (Border Gateway Protocol) protocols do not support green-path selection that accounts for energy efficiency and ecological factors.

Although green networking metrics have been considered for improving the environmental sustainability of networks, there is a lack of protocol-specific methodology to distribute these metrics. Further, there is a lack of processes for securely validating these metrics, and there are no attributes in existing protocols to encode and store these metrics. For example, green networking metrics and energy consumption of network devices are discussed in A. Clemm, et al., "Green Networking Metrics" Internet Engineering Task Force, available at https://datatracker.ietf.org/doc/draft-cx-green-metrics/, but this document fails to provide a protocol-specific methodology to distribute these metrics.

Accordingly, there is a need to implement green network protocols that distribute and use green metrics to thereby provide cost savings, alignment with environmental standards, heightened efficiency, and an enhanced commitment to corporate social responsibility and compliance.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example of nodes of one or more autonomous systems and a link connecting the nodes, in accordance with some embodiments.

FIG. 7 illustrates an example of a flow diagram of a method for using a green score to improve the environmental sustainability of route traffic between autonomous systems, in accordance with some embodiments.

DESCRIPTION OF EXAMPLE EMBODIMENTS

Figure 1:
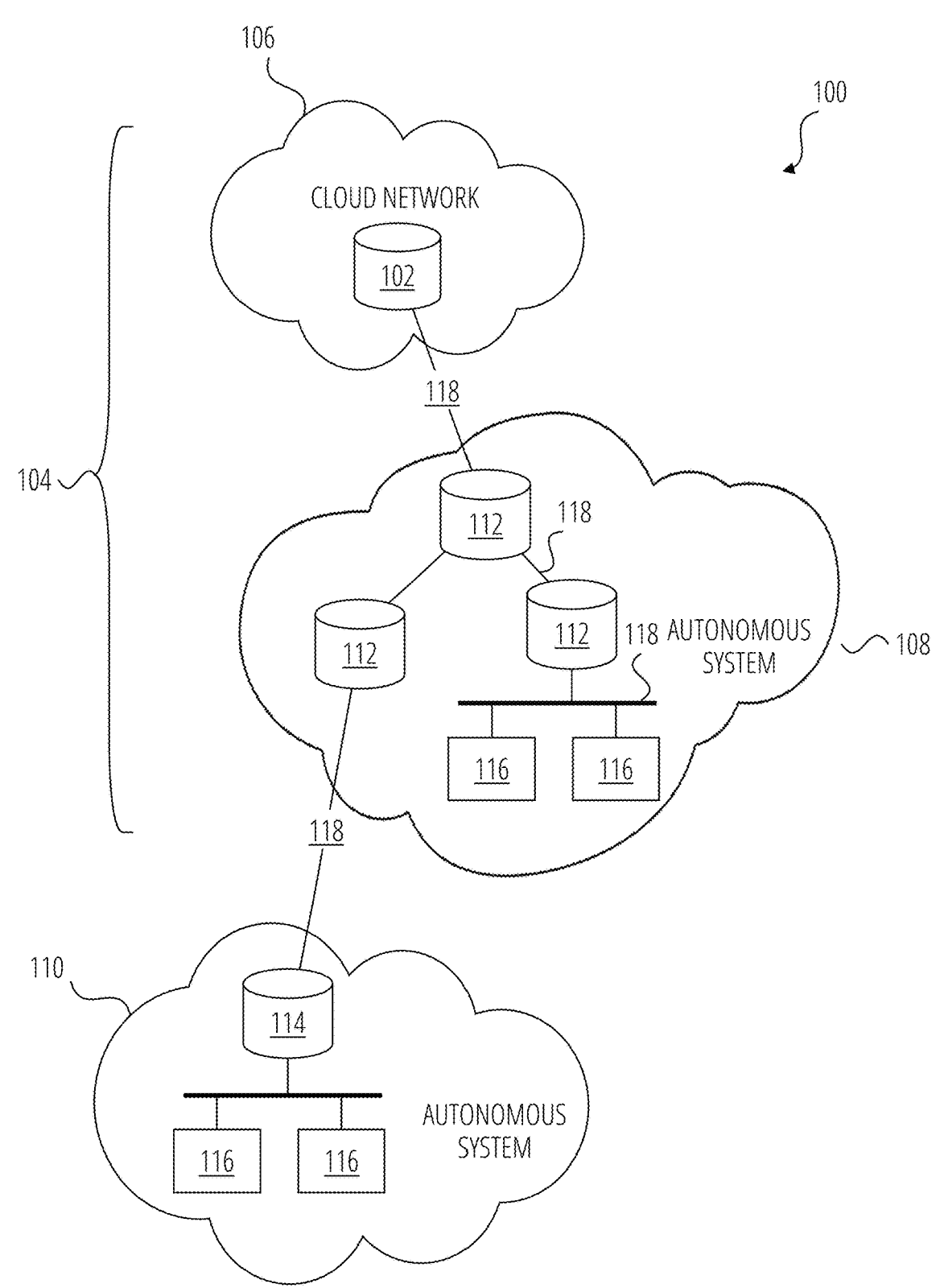
FIG. 1 illustrates an example of network environment in which data packets are routed through and between respective autonomous systems, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

In one aspect, a method is provided for routing data traffic through a network. The method includes assigning first-level green scores to respective nodes within one or more autonomous systems in a network; and pushing node and adjacency labels to a headend path computation client (PCC) within a first autonomous system of the one or more autonomous systems. The method further includes determining, for data packets, a label switched path (LSP) from a source node to a destination node within the first autonomous system, the LSP being determined based on the first-level green scores and the node and adjacency labels; and routing the data packets from the source node to the destination node based on the LSP.

In another aspect, the method may also include that the node and adjacency labels are pushed to the headend path computation client (PCC) from a central controller of the first autonomous system. The method further includes assigning the first-level green scores to the respective nodes within the first autonomous system comprises: pulling, to the central controller, green information representing locations of the respective nodes of the first autonomous system, electrical energy consumption information of the respective nodes of the first autonomous system, and an environmental impact of energy production associated with the locations of the respective nodes of the first autonomous system, and calculating the first-level green scores corresponding to the respective nodes of the first autonomous system based on the green information associated with the respective nodes of the first autonomous system.

In another aspect, the method may also include that the central controller is a segment routing path computation element (SR-PCE), the SR-PCE performs a path computation element protocol (PCEP) between one or more PCEs of the first autonomous system and one or more path computation clients (PCCs) corresponding to the respective nodes, the PCEP comprises carrying attributes of the one or more PCCs to the one or more path computation elements (PCEs), and the attributes comprise types or models of routers at the respective nodes, electrical power consumption of the respective nodes, and/or locations of the respective nodes.

In another aspect, the method may also include retrieving a CO2 emission factor from a database that indicates CO2 emissions associated with electrical energy production as a function of location; and using the CO2 emission factors corresponding to the locations of the respective nodes to determine the environmental impact of energy production associated with the locations of the respective nodes.

In another aspect, the method may also include that the environmental impact of energy production associated with the locations of the respective nodes of the first autonomous system is the CO2 emissions corresponding to a quantity of electrical energy produced, and the first-level green score of a given node is related to an amount of CO2 emissions associated with processing the data packets at the given node.

In another aspect, the method may also include determining exit nodes for sending the data packets between pairs of one or more autonomous systems of the one or more autonomous systems based on the first-level green scores.

In another aspect, the method may also include pulling, to a segment routing path computation element (SR-PCE), green information of the respective nodes by: performing, at the SR-PCE, a path computation element protocol (PCEP) between one or more path computation elements (PCEs) of the autonomous systems and one or more path computation clients (PCCs) corresponding to the respective nodes, wherein the PCEP comprises carrying attributes of the one or more PCCs to the one or more PCEs, and the attributes comprise types or models of routers at the respective nodes, electrical power consumption of the respective nodes, and/or locations of the respective nodes. The method further includes calculating the first-level green scores corresponding to the respective nodes based on the green information associated with the respective nodes; pushing the first-level green scores from the PCEs to autonomous system border routers (ASBRs) of the PCCs via the PCEP, and communicating the first-level green scores from the ASBRs to neighboring autonomous systems via border gateway protocol (BGP) update messages.

In another aspect, the method may also include selecting a first exit node in the first autonomous system that forms a link to a second autonomous system based on the first exit node having a more environmentally favorable first-level green score than other nodes of the first autonomous system that form links to nodes of the second autonomous system; and assigning the more environmentally favorable first-level green score to address prefixes received at the first autonomous system from second-level green scores via the first exit node relative to the first-level green score assigned to address prefixes received at the first autonomous system from second-level green scores via the other exit nodes, favoring paths of the data packets through the first exit node relative to the other exit nodes.

In another aspect, the method may also include that the first-level green scores are encoded in a type-length-value (TLV) field of an interior gate protocol (IGP) to exchange the TLV field among the IGP nodes, and the TLV field for the first-level green scores includes a type of green score, a length of one octet and a value ranging between 0 and 255.

In another aspect, the method may also include determining a second-level green score for each of the one or more autonomous systems, the second-level green score of a respective autonomous system of the one or more autonomous systems being based on the first-level green scores of the respective autonomous system; and advertising the second-level green score for each of the one or more autonomous systems to peer one or more autonomous systems.

In another aspect, the method may also include that advertising the second-level green score for each of the one or more autonomous systems to peer one or more autonomous systems comprises: defining the second-level green score as a border gateway protocol (BGP) path attribute; and encoding the second-level green score in the BGP path attribute; and exchanging, between autonomous system border routers (ASBRs), the BGP path attribute via BGP update messages.

In another aspect, the method may also include that determining the second-level green score comprises: pulling, to a segment routing path computation element (SR-PCE), green information of the respective nodes by: performing, at the SR-PCE, a path computation element protocol (PCEP) between one or more path computation elements (PCEs) of the autonomous systems and one or more path computation clients (PCCs) corresponding to the respective nodes, wherein the PCEP comprises carrying attributes of the one or more PCCs to the one or more PCEs, and the attributes comprise types or models of routers at the respective nodes, electrical power consumption of the respective nodes, and/or locations of the respective nodes. The method further includes calculating the first-level green scores corresponding to the respective nodes based on the green information associated with the respective nodes; calculating the second-level green score of an autonomous system of the one or more autonomous systems based on the first-level green scores of a set of nodes of the autonomous system; pushing the second-level green scores to autonomous system border routers (ASBRs) of the PCCs via the PCEP, and communicating the second-level green scores from the ASBRs to neighboring autonomous systems of the autonomous system via border gateway protocol (BGP) update messages.

In another aspect, the method may also include that the second-level green score of the first autonomous system is calculated by a process selected from the group consisting of counting a number of green nodes in the first autonomous system, averaging the first-level green scores of the nodes in the first autonomous system, and determining a percentage of the nodes that are green nodes in the first autonomous system.

In another aspect, the method may also include classifying the nodes as either green or non-green based on a comparison to a threshold such that nodes having a value of the green score that is in a first range relative to the threshold are classified as green and nodes having the value of the green score that is in a second range, which does not overlap the first range, relative to the threshold are classified as non-green.

In another aspect, the method may also include using the second-level green score to select which intermediary autonomous systems the data packets are routed through when the data packets are routed from a source autonomous system to a destination autonomous system that lack direct links such that the data traffic passes through at least one of the intermediary autonomous systems, wherein the one or more autonomous systems include the source autonomous system, the destination autonomous system, and the intermediary autonomous systems, and the data packets are routed from the source autonomous system to the destination autonomous system via a selected one of the intermediary autonomous systems.

In another aspect, the method may also include that a selected intermediary autonomous system is selected based on having a lowest hop count for routing the selected the data packets, and when more than one of the intermediary autonomous systems have a same hop count and provide alternative paths for the data packets, the selected intermediary autonomous system is selected based on having a more environmentally favorable value for the second-level green score than other intermediary autonomous systems of the more than one of the intermediary autonomous systems having the same hop count.

In another aspect, the method may also include that a selected intermediary autonomous system is selected based on each hop of the intermediary autonomous systems having values for the first-level green scores, and a central controller calculates the second-level green score by cumulating the values of the first-level green scores along respective routes through the respective intermediary autonomous systems to determine respective optimal routes through each of the intermediary autonomous systems, the central controller selects the selected intermediary autonomous system based on the second-level green score and other network parameters to generate a routing decision, and the central controller pushes the routing decision to the headend PCC.

In another aspect, the method may also include that authenticating, at the first autonomous system, a second-level green score advertised by a second autonomous system, the authentication being performed by: communicating securely with a regulator to obtain information regarding an authenticity of the second-level green score advertised by the second autonomous system; and confirming that the second-level green score advertised by the second autonomous system can be used for routing decisions based on the obtained information from the regulator.

In one aspect, a computing apparatus includes a processor. The computing apparatus also includes a memory storing instructions that, when executed by the processor, configure the apparatus to perform the respective steps of any one of the aspects of the above-recited methods.

In one aspect, a computing apparatus includes a processor. The computing apparatus also includes a memory storing instructions that, when executed by the processor, configure the apparatus to assign first-level green scores to respective nodes within one or more autonomous systems in a network; push node and adjacency labels to a headend path computation client (PCC) within a first autonomous system of the one or more autonomous systems; determine, for data packets, a label switched path (LSP) from a source node to a destination node within the first autonomous system, the LSP being determined based on the first-level green scores and the node and adjacency labels; and routing the data packets from the source node to the destination node based on the LSP.

In another aspect, the computing apparatus may also include that the node and adjacency labels are pushed to the headend path computation client (PCC) from a central controller of the first autonomous system. Further, when executed by the processor, the instructions stored in the memory further configure the apparatus to assign the first-level green scores to the respective nodes within the first autonomous system by: pulling, to the central controller, green information representing locations of the respective nodes of the first autonomous system, electrical energy consumption information of the respective nodes of the first autonomous system, and an environmental impact of energy production associated with the locations of the respective nodes of the first autonomous system, and calculating the first-level green scores corresponding to the respective nodes of the first autonomous system based on the green information associated with the respective nodes of the first autonomous system.

In another aspect, the computing apparatus may also include that, when executed by the processor, the instructions stored in the memory further configure the apparatus to: determine a second-level green score for each of the one or more autonomous systems, the second-level green score of a respective autonomous system of the one or more autonomous systems being based on the first-level green scores of the respective autonomous system; and advertise the second-level green score for each of the one or more autonomous systems to peer one or more autonomous systems.

In some aspects, the techniques described herein relate to a method of routing data traffic through a network, the method including: assigning first-level green scores to respective nodes within one or more autonomous systems in a network, the first-level green scores being based in part on an environmental impact of energy production associated with locations of the respective nodes; pushing node and adjacency labels to a headend path computation client (PCC) within a first autonomous system of the one or more autonomous systems; determining, for data packets, a label switched path (LSP) from a source node to a destination node within the first autonomous system, the LSP being determined based on the first-level green scores and the node and adjacency labels; and routing the data packets from the source node to the destination node based on the LSP.

In some aspects, the techniques described herein relate to a method, wherein the node and adjacency labels are pushed to the headend PCC from a central controller of the first autonomous system; and assigning the first-level green scores to the respective nodes within the first autonomous system includes: pulling, to the central controller, green information representing locations of the respective nodes of the first autonomous system, electrical energy consumption information of the respective nodes of the first autonomous system, and the environmental impact of energy production associated with the locations of the respective nodes of the first autonomous system, and calculating the first-level green scores corresponding to the respective nodes of the first autonomous system based on the green information associated with the respective nodes of the first autonomous system, wherein the central controller is a segment routing path computation element (SR-PCE), the SR-PCE performs a path computation element protocol (PCEP) between one or more path computation elements (PCEs) of the first autonomous system and one or more path computation clients (PCCs) corresponding to the respective nodes, the PCEP includes carrying attributes of the one or more PCCs to the one or more PCEs, and the attributes include types or models of routers at the respective nodes, electrical power consumption of the respective nodes, and/or locations of the respective nodes.

In some aspects, the techniques described herein relate to a method, further including: retrieving a $CO_2$ emission factor from a database that indicates $CO_2$ emissions associated with electrical energy production as a function of location; and using the $CO_2$ emission factors corresponding to the locations of the respective nodes to determine the environmental impact of energy production associated with the locations of the respective nodes.

In some aspects, the techniques described herein relate to a method, further including: determining exit nodes for sending the data packets between pairs of one or more autonomous systems of the one or more autonomous systems based on the first-level green scores.

In some aspects, the techniques described herein relate to a method, wherein the first-level green scores are encoded in a type-length-value (TLV) field of an interior gate protocol (IGP) to exchange the TLV field among the IGP nodes, and the TLV field for the first-level green scores includes a type of green score, a length of one octet and a value ranging between 0 and 255.

In some aspects, the techniques described herein relate to a method, further including: determining a second-level green score for each of the one or more autonomous systems, the second-level green score of a respective autonomous system of the one or more autonomous systems being based on the first-level green scores of the respective autonomous system; and advertising the second-level green score for each of the one or more autonomous systems to peer one or more autonomous systems.

In some aspects, the techniques described herein relate to a method, wherein determining a second-level green score includes: pulling, to a segment routing path computation element (SR-PCE), green information of the respective nodes by: performing, at the SR-PCE, a path computation element protocol (PCEP) between one or more path computation elements (PCEs) of the autonomous systems and one or more path computation clients (PCCs) corresponding to the respective nodes, wherein the PCEP includes carrying attributes of the one or more PCCs to the one or more path computation elements (PCEs), and the attributes include types or models of routers at the respective nodes, electrical power consumption of the respective nodes, and/or locations of the respective nodes; calculating the first-level green scores corresponding to the respective nodes based on the green information associated with the respective nodes; calculating the second-level green score of an autonomous system of the one or more autonomous systems based on the first-level green scores of a set of nodes of the autonomous system; pushing the second-level green scores to autonomous system border routers (ASBRs) of the PCCs via the PCEP, and communicating the second-level green scores from the ASBRs to neighboring autonomous systems of the autonomous system via border gateway protocol (BGP) update messages.

In some aspects, the techniques described herein relate to a method, further including: authenticating, at the first autonomous system, a second-level green score advertised by a second autonomous system, the authentication being performed by: communicating securely with a regulator to obtain information regarding an authenticity of the second-level green score advertised by the second autonomous system; and confirming that the second-level green score advertised by the second autonomous system can be used for routing decisions based on the obtained information from the regulator.

In some aspects, the techniques described herein relate to a computing apparatus including: a processor; and a memory storing instructions that, when executed by the processor, configure the apparatus to: assign first-level green scores to respective nodes within one or more autonomous systems in a network, the first-level green scores being based in part on an environmental impact of energy production associated with locations of the respective nodes; push node and adjacency labels to a headend path computation client (PCC) within a first autonomous system of the one or more autonomous systems; determine, for data packets, a label switched path (LSP) from a source node to a destination node within the first autonomous system, the LSP being determined based on the first-level green scores and the node and adjacency labels; and rout the data packets from the source node to the destination node based on the LSP.

In some aspects, the techniques described herein relate to a computing apparatus, wherein the node and adjacency labels are pushed to the headend PCC from a central controller of the first autonomous system; and assigning the first-level green scores to the respective nodes within the first autonomous system includes: pulling, to the central controller, green information representing locations of the respective nodes of the first autonomous system, electrical energy consumption information of the respective nodes of the first autonomous system, and the environmental impact of energy production associated with the locations of the respective nodes of the first autonomous system, and calculating the first-level green scores corresponding to the respective nodes of the first autonomous system based on the green information associated with the respective nodes of the first autonomous system, wherein the central controller is a segment routing path computation element (SR-PCE), the SR-PCE performs a path computation element protocol (PCEP) between one or more path computation elements (PCEs) of the first autonomous system and one or more path computation clients (PCCs) corresponding to the respective nodes, the PCEP includes carrying attributes of the one or more PCCs to the one or more PCEs, and the attributes include types or models of routers at the respective nodes, electrical power consumption of the respective nodes, and/or locations of the respective nodes.

In some aspects, the techniques described herein relate to a computing apparatus, wherein the stored instructions further configure the apparatus to: retrieve a $CO_2$ emission factor from a database that indicates $CO_2$ emissions associated with electrical energy production as a function of location; and use the $CO_2$ emission factors corresponding to the locations of the respective nodes to determine the environmental impact of energy production associated with the locations of the respective nodes.

In some aspects, the techniques described herein relate to a computing apparatus, wherein the stored instructions further configure the apparatus to: determine exit nodes for sending the data packets between pairs of one or more autonomous systems of the one or more autonomous systems based on the first-level green scores.

In some aspects, the techniques described herein relate to a computing apparatus, wherein the stored instructions further configure the apparatus to: determine a second-level green score for each of the one or more autonomous systems, the second-level green score of a respective autonomous system of the one or more autonomous systems being based on the first-level green scores of the respective autonomous system; and advertise the second-level green score for each of the one or more autonomous systems to peer one or more autonomous systems.

In some aspects, the techniques described herein relate to a computing apparatus, wherein the stored instructions further configure the apparatus to determine the second-level green score by: pulling, to a segment routing path computation element (SR-PCE), green information of the respective nodes by: performing, at the SR-PCE, a path computation element protocol (PCEP) between one or more path computation elements (PCEs) of the autonomous systems and one or more path computation clients (PCCs) corresponding to the respective nodes, wherein the PCEP includes carrying attributes of the one or more PCCs to the one or more path computation elements (PCEs), and the attributes include types or models of routers at the respective nodes, electrical power consumption of the respective nodes, and/or locations of the respective nodes; calculating the first-level green scores corresponding to the respective nodes based on the green information associated with the respective nodes; calculating the second-level green score of an autonomous system of the one or more autonomous systems based on the first-level green scores of a set of nodes of the autonomous system; pushing the second-level green scores to autonomous system border routers (ASBRs) of the PCCs via the PCEP, and communicating the second-level green scores from the ASBRs to neighboring autonomous systems of the autonomous system via border gateway protocol (BGP) update messages.

In some aspects, the techniques described herein relate to a computing apparatus, wherein the stored instructions further configure the apparatus to: authenticate, at the first autonomous system, a second-level green score advertised by a second autonomous system, the authentication being performed by: communicating securely with a regulator to obtain information regarding an authenticity of the second-level green score advertised by the second autonomous system; and confirming that the second-level green score advertised by the second autonomous system can be used for routing decisions based on the obtained information from the regulator.

In some aspects, the techniques described herein relate to a non-transitory computer-readable storage medium, the computer-readable storage medium including instructions that when executed by a computer, cause the computer to: assign first-level green scores to respective nodes within one or more autonomous systems in a network, the first-level green scores being based in part on an environmental impact of energy production associated with locations of the respective nodes; push node and adjacency labels to a headend path computation client (PCC) within a first autonomous system of the one or more autonomous systems; determine, for data packets, a label switched path (LSP) from a source node to a destination node within the first autonomous system, the LSP being determined based on the first-level green scores and the node and adjacency labels; and rout the data packets from the source node to the destination node based on the LSP.

In some aspects, the techniques described herein relate to a non-transitory computer-readable storage medium, wherein the instructions that are included on the computer computer-readable storage medium cause the computer to: push the node and adjacency labels to the headend PCC from a central controller of the first autonomous system; and assign the first-level green scores to the respective nodes within the first autonomous system by: pulling, to the central controller, green information representing locations of the respective nodes of the first autonomous system, electrical energy consumption information of the respective nodes of the first autonomous system, and the environmental impact of energy production associated with the locations of the respective nodes of the first autonomous system, and calculating the first-level green scores corresponding to the respective nodes of the first autonomous system based on the green information associated with the respective nodes of the first autonomous system, wherein the central controller is a segment routing path computation element (SR-PCE), the SR-PCE performs a path computation element protocol (PCEP) between one or more path computation elements (PCEs) of the first autonomous system and one or more path computation clients (PCCs) corresponding to the respective nodes, the PCEP includes carrying attributes of the one or more PCCs to the one or more PCEs, and the attributes include types or models of routers at the respective nodes, electrical power consumption of the respective nodes, and/or locations of the respective nodes.

In some aspects, the techniques described herein relate to a non-transitory computer-readable storage medium, wherein the instructions that are included on the computer computer-readable storage medium cause the computer to: determine a second-level green score for each of the one or more autonomous systems, the second-level green score of a respective autonomous system of the one or more autonomous systems being based on the first-level green scores of the respective autonomous system; and advertise the second-level green score for each of the one or more autonomous systems to peer one or more autonomous systems.

In some aspects, the techniques described herein relate to a non-transitory computer-readable storage medium, wherein the instructions that are included on the computer computer-readable storage medium cause the computer to determine the second-level green score by: pulling, to a segment routing path computation element (SR-PCE), green information of the respective nodes by: performing, at the SR-PCE, a path computation element protocol (PCEP) between one or more path computation elements (PCEs) of the autonomous systems and one or more path computation clients (PCCs) corresponding to the respective nodes, wherein the PCEP includes carrying attributes of the one or more PCCs to the one or more path computation elements (PCEs), and the attributes include types or models of routers at the respective nodes, electrical power consumption of the respective nodes, and/or locations of the respective nodes; calculating the first-level green scores corresponding to the respective nodes based on the green information associated with the respective nodes; calculating the second-level green score of an autonomous system of the one or more autonomous systems based on the first-level green scores of a set of nodes of the autonomous system; pushing the second-level green scores to autonomous system border routers (ASBRs) of the PCCs via the PCEP, and communicating the second-level green scores from the ASBRs to neighboring autonomous systems of the autonomous system via border gateway protocol (BGP) update messages.

In some aspects, the techniques described herein relate to a non-transitory computer-readable storage medium, wherein the instructions that are included on the computer computer-readable storage medium cause the computer to: authenticate, at the first autonomous system, a second-level green score advertised by a second autonomous system, the authentication being performed by: communicating securely with a regulator to obtain information regarding an authenticity of the second-level green score advertised by the second autonomous system; and confirming that the second-level green score advertised by the second autonomous system can be used for routing decisions based on the obtained information from the regulator.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for green network protocols that distribute and use green metrics to thereby provide cost savings, alignment with environmental standards, heightened efficiency, and an enhanced commitment to corporate social responsibility and compliance.

According to certain non-limiting examples, the methods and systems disclosed herein use a green score to improve environmental sustainability for routing traffic between and or/within autonomous systems (ASs). Node-level green scores are calculated based on environmental information of the nodes (e.g., locations, router type, electrical consumption, and location-dependent environmental impact of electrical production), and AS-level green scores are based on the node-level green score from the respective ASs. For intra-AS routing, node and adjacency labels are pushed to a headend path computation client (PCC), and the label switched path (LSP) is determined based on the node-level green scores and the node and adjacency labels. For inter-AS routing, the AS having a better AS-level green score is preferred, when the routes through the respective ASs are equal-cost multi-path (ECMP) routes. Exit nodes between ASs are selected based on the node-level green scores.

FIG. 1 is a simplified block diagram of a network environment 100 including a communication system 104 for providing optimized best path selection for optimal routing of data packets in an autonomous system AS1 108. Network environment 100 represents a series of points or nodes of interconnected communication paths for receiving and transmitting packets of information that propagate through the network. Network environment 100 offers a communicative interface between nodes, and may include any local area network (LAN), wireless local area network (WLAN), metropolitan area network (MAN), Intranet, Extranet, wide area network (WAN) such as the internet, cloud network, virtual private network (VPN), or any other appropriate architecture or system that facilitates communications in the network environment. Additionally, network environment 100 may implement a UDP/IP connection and use a TCP/IP communication language protocol in particular embodiments of the present disclosure. Alternatively, any other suitable communication protocol for transmitting and receiving data packets within network environment 100 may be implemented.

Network environment 100 illustrates distributed nodes 102, 112, and 114 being interconnected via communication links 118. Nodes 112 are provisioned in autonomous system AS1 108 and node 114 is provisioned in an autonomous system AS1 110. Autonomous systems AS1 108 and AS1 110 may be configured as distinct routing domains. Nodes 112 and 114 are network elements, such as routers, that can offer intra-domain routing for electronic data between end nodes 116 within their respective autonomous systems AS1 108 and AS1 110. At least some of nodes 112 and 114 can provide inter-domain routing for electronic data between end nodes 116 in autonomous system AS1 108 and other end nodes 116 in autonomous system AS1 110. Node 102 is network element, such as a router, and may be provisioned in cloud network 106 for AS1 108. In at least one embodiment, cloud network 106 may be physically remote from autonomous system AS1 108 and may be accessible over the Internet or other wide area network. Node 102 may be part of the same routing domain as autonomous system AS1 108.

End nodes 116 are intended to include devices used to initiate communication in network environment 100, such as desktops, laptops, servers, appliances, mobile devices, or any other device, component, element, or object capable of initiating voice, audio, video, media, or data exchanges within network environment 100. End nodes can also include any device that seeks to initiate a communication on behalf of another entity or element, such as a program, a database, or any other component, device, element, or object capable of initiating an exchange within network environment 100. It should be noted that FIG. 1 is a representation of possible elements of a communication system for providing optimized best path selection in an autonomous system. As such, any number of links 118, nodes 102, 112, and 114, and end nodes 116 may be configured in a communication system. For example, some autonomous systems may contain thousands of nodes 112 and an even greater number of end nodes 116 and links 118.

Various routing protocols may be implemented in communication system 104 to enable appropriate routing from autonomous system AS1 108 to autonomous system AS1 110. Border Gateway Protocol (BGP) is an example routing protocol that enables inter-domain routing between autonomous systems. An external BGP (eBGP) session provides routing information for routes that allow an autonomous system to reach other autonomous systems. An internal BGP (iBGP) session provides routing information for routes inside an autonomous system to external destinations. BGP is a routing protocol, which according to certain non-limiting examples is defined in Request for Comments (RFC) 4271, by Rekhter, Y., at al., "A Border Gateway Protocol 4 (BGP-4)", RFC 4271, DOI 100.17487/RFC4271, January 2006, http://www.rfc-editor.org/info/rfc4271.

A BGP session can be established when BGP neighbor routers (also referred to herein as 'peer nodes') establish a connection. This connection is typically established using a connection-oriented protocol such as Transmission Control Protocol (TCP), which ensures the delivery of messages between the connected peer nodes. The connected peer nodes can speak BGP to exchange update messages containing routing information. Update messages are used to update information contained in a routing information base (RIB) of the receiving peer node. An update message can announce a new route or withdraw a previously announced route. Update messages can include various fields such as network layer reachability information (NLRI). NLRI may include Internet Protocol (IP) address prefixes of feasible routes being advertised in the update message. Conversely, a field for withdrawn routes may include IP address prefixes for routes being withdrawn because they are no longer reachable. A route is a unit of information that pairs a set of destinations with attributes of a path to those destinations. A path can be defined by one or more attributes and is generally intended to mean the route between two points in a network, such as an autonomous system. IP addresses taken from an IPv4 or IPv6 pool can be divided into two parts including a network section and a host section. The network section identifies a set of destinations and is referred to as the prefix. A prefix in a destination address is used by a routing protocol to render a routing decision for the next hop in the path. A prefix may also be referred to as a routing prefix.

FIG. 2 illustrates a simplified block diagram of possible embodiments of node 102 and nodes 112, as shown in FIG. 1. Nodes 102 and 112 may include, respectively, multiple network interfaces 202 and 214, at least one memory element 204 and 216, and at least one processor 206 and 218. Processors 206 and 218 may be operably coupled to respective network interfaces 202 and 214, which include suitable transmitting and receiving components for communicating over communication links 118 in network environment 100. Furthermore, nodes 102 and/or 112 may be implemented in physical or virtualized environments or a suitable combination thereof.

Routing protocols can be implemented in nodes 102 and 112 to achieve the optimized best path determinations. Border gateway protocol (BGP) 210 can be implemented in node 102. Border gateway protocol (BGP) 222 can be implemented in node 112. Interior gateway protocol (IGP) 212 and 224 can be implemented in nodes 102 and 112, respectively. BGP communications may be transmitted and received between node 102 and its clients (e.g., node 112) via a transmission protocol such as TCP/IP. In certain embodiments, border gateway protocol 210 of node 102 can include optimized best path selection logic for computing best paths through autonomous system AS1 108 to reach external destinations such as autonomous system AS1 110. A network connection can be established between node 112 and node 102 to speak BGP and exchange routing information that can be used to route data from internal nodes of autonomous system AS1 108 to external destinations.

Data associated with embodiments described herein may be stored in memory elements 204 and 216 of nodes 102 and 112, respectively, in at least one embodiment. In node 102, the data can include, but is not limited to, a routing table 208. Routing table 208 can include IGP metrics (e.g., a cost) for each BGP next hop, which can be measured from designated nodes referred to as 'root nodes'. Also routing table 208 (or some other suitable storage structure) may include reachability information for network address prefixes advertised by clients of node 102. In at least one embodiment, routing table 208 may be implemented as a routing information base (RIB) table, which can include routing information for all routing protocols running in communication system 104.

In node 112, stored data may include a routing table 220 that includes routing information to enable node 112 to route network traffic within autonomous system AS1 108 and possibly to external destinations. In particular, routing table 220 may contain best path information for network address prefixes, after the best paths are selected and advertised by node 102. Contents of routing table 220 can depend, at least in part, on its location within autonomous system AS1 108. For example, routing information may vary based on a cluster of routers to which a node is assigned. A best path for a particular prefix stored in a router of one cluster may vary with respect to a best path for the same prefix stored in another router of another cluster in the same autonomous system.

Figure 3:
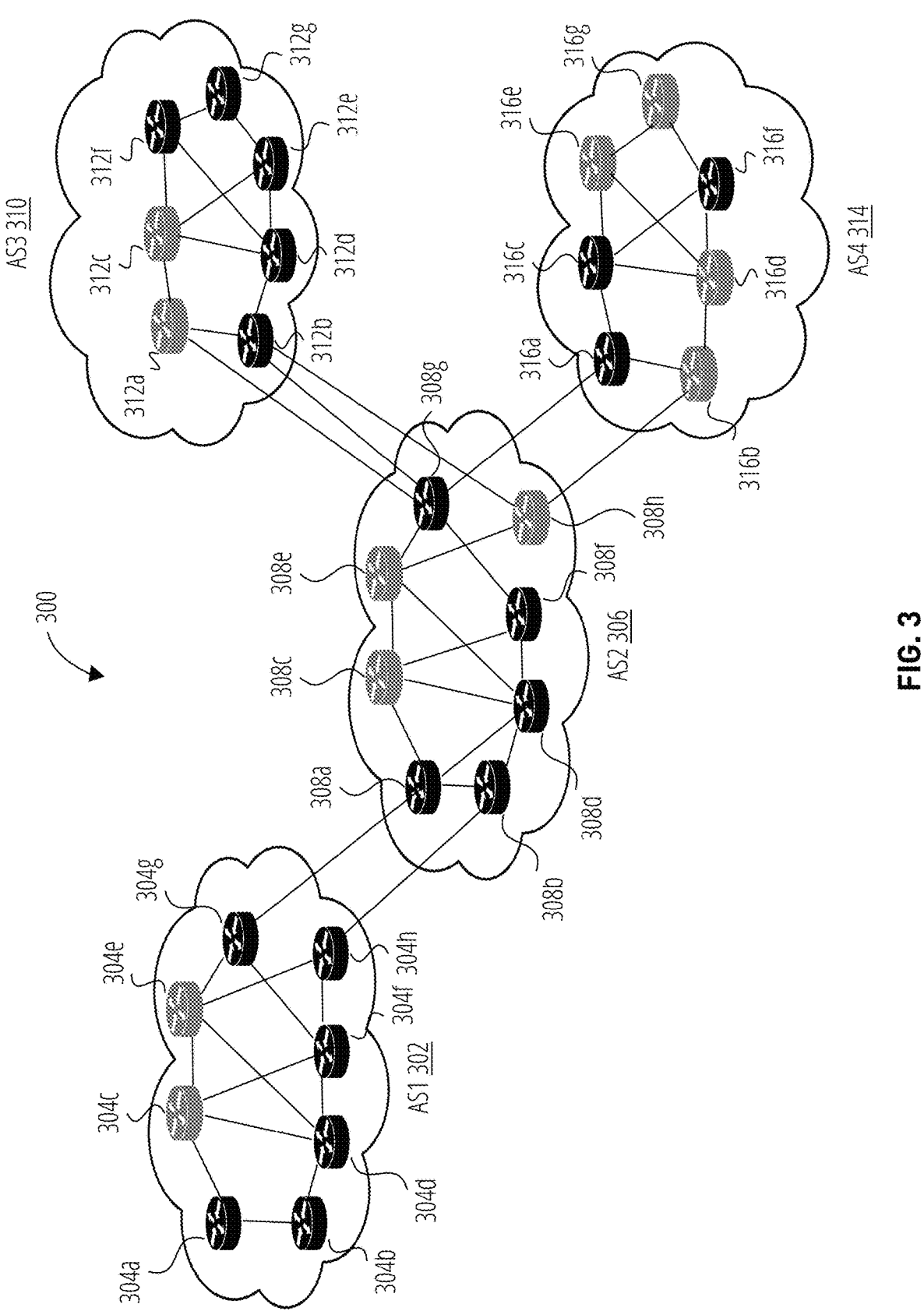
FIG. 3 illustrates an example of a network topology diagram that includes autonomous systems having nodes that are interconnected via links within and between the autonomous systems, in accordance with some embodiments.

FIG. 3 illustrates a non-limiting example of a network 300 that includes four autonomous systems (i.e., AS1 302, AS2 306, AS3 310, and AS4 314). The network 300 is configured to take into account for the sustainability of the environment when considering routing decisions. For example, the nodes can generate a green score (also be referred to as a node-level green score to distinguish from the AS-level green score discussed below), which is a value that represents the degree to which the corresponding node operates in an environmentally sustainable manner. For example, the green score can combine several attributes of the node to represent a combination of the energy efficiency of the router at the particular node, the sustainability of the electrical energy source supplying the node, the carbon footprint of the node, and/or other factors. The green score allows routing decisions to be based, at least partly, on selecting nodes with more environmentally sustainable properties/attributes.

In the non-limiting example illustrated in FIG. 3, AS1 302 includes eight nodes (i.e., node1 304a, node2 304b, node3 304c, node4 304d, node5 304e, node6 304f, node7 304g, and node8 304h). AS2 306 includes eight nodes (i.e., node1 308a, node2 308b, node3 308c, node4 308d, node5 308e, node6 308f, node7 308g, and node8 308h). AS3 310 includes seven nodes (i.e., node1 312a, node2 312b, node3 312c, node4 312d, node5 312e, node6 312f, and node7 312g). AS4 314 includes eight nodes (i.e., node1 316a, node2 316b, node3 316c, node4 316d, node5 316e, node6 316f, and node7 316g).

In this example, the colors of the nodes indicate the relative values of green scores of the nodes. More particularly, the black nodes have lower green scores relative to the grey nodes. According to certain non-limiting examples, the nodes shown in black are referred to as "green nodes" and the nodes shown in grey are referred to as "non-green nodes." For example, a threshold can be applied to the green scores of the respective nodes to classify the nodes as either green or non-green nodes.

As illustrated in AS1 108, of FIG. 3, the black nodes (e.g., node1 304a, node2 304b, 304d, etc.) have lower green scores relative to the grey nodes (e.g., node3 304c and node5 304e). Further, According to certain non-limiting examples, AS1 302 and AS3 310 are Multiprotocol Label Switching (MPLS) networks without a central controller, and AS2 306 and AS4 314 are networks that each have a Segment Routing Path Computation Element (SR-PCE) controller.

According to certain non-limiting examples, using network 300, sustainability within internet protocol (IP) networking can be realized by constructing, deploying, and maintaining network structures and services that are directed to reduce environmental harm, optimize resource utilization, and ensure long-term sustainability. This can be realized, for example, by improving the existing Interior Gateway Protocol (IGP) and Border Gateway Protocol (BGP) protocols to support green path selection that considers energy efficiency and ecological factors. As used herein the term "green" means environmentally favorable or good for the environment/nature (e.g., by reducing carbon emissions either by using less electrical energy or by using electrical energy that comes from renewable resources, such as solar and wind, rather than from burning fossil fuels or other energy sources that have a substantial carbon footprint). Implementing such green network protocols can lead to cost savings, alignment with environmental standards, heightened efficiency, and an enhanced commitment to corporate social responsibility and/or compliance. For example, depending on the adopted convention a smaller green score can mean environmentally more favorable (e.g., lower carbon footprint, or the adopted convention can be the opposite with a larger green score meaning environmentally more favorable (e.g., lower carbon footprint). Here, the convention is adopted that a smaller green score can mean environmentally more favorable, but this is a non-limiting example, and a different convention is within the scope of the disclosure herein.

Using a green score in the decision process for routing network traffic can provide visibility regarding environmentally favorable routes and nodes. This visibility can enable the determination of the most environmentally sustainable path and can enable environmentally sustainable Autonomous Systems (ASs).

Accordingly, the methods and systems disclosed herein provide, among other things, enhancements for both IGP and BGP protocols to support end-to-end green path selection. This can be achieved in various ways and in various types of systems. For example, the green score can be used for intra-AS routing in either an Autonomous System (AS) with a central controller or an AS without a central controller. Further, for inter-AS communications, the green score can assist in selecting the optimal green route from one AS to a neighboring AS, and, when choosing among ASs for a routing path, the green score can be used to determine which AS is more green.

According to certain non-limiting examples, the disclosed methods and systems use the green scores to achieve more environmentally friendly network routing using an AS with a central controller (e.g., a central controller such as Segment Routing Path Computation Element (SR-PCE)). An AS with a central controller can have several paths from the source node to the destination node. When determining the most environmentally sustainable path (e.g., the optimal ecological path), the methods and systems disclosed herein use the green score to provide improvements to the current Interior Gateway Protocol (IGP) routing protocols (e.g., Open Shortest Path First (OSPF), Intermediate System to Intermediate System (IS-IS), or Dijkstra's algorithm) to account for eco-friendly links or nodes.

According to certain non-limiting examples, the disclosed methods and systems can use the green scores to achieve more environmentally friendly network routing in an AS that have a central controller. In this case, there may be several paths from the source to the destination. Without access to a metric such as the green score, the Provider Edge (PE) lacks the capability to decipher which of the links and/or nodes are eco-friendly, and therefore the PE fails to account for which links and/or nodes are eco-friendly when determining the traffic path and fails to provide the most environmentally sustainable path (e.g., the optima ecological path).

According to certain non-limiting examples, the disclosed methods and systems use the green scores to achieve more environmentally friendly network routing for inter-AS communications. For example, consider the nodes at the boundaries of two neighboring ASs. When determining which link to be used for inter-AS communications, there may be many candidate links between respective nodes of the first AS to corresponding nodes of the second AS. Selecting a link with a high value for the green score of the nodes at both the first AS and the second AS can provide improved environmental sustainability. That is, the green score can be used in selecting the optimal green nodes connecting neighboring ASs to facilitate inter-AS communications.

Further, for inter-AS communications, the process of selecting ASs along which to route network traffic can be improved by using the green score. For example, a less green AS can be avoided in favor of a more green AS to provide a more environmentally sustainable path.

Generally to all methods and systems disclosed herein, a green score is determined for the respective nodes based on green attributes associated with the respective nodes (e.g., the type/model of router, power consumption values (such as the average power consumption), and location of the node hardware/router (e.g., the country, state, province, county, district, city, town, and/or zip code).

For example, in an AS with SR-PCE, a Path Computation Element Protocol (PCEP) can be performed between the path computation element (PCE) and the path computation client (PCC). The PCEP functionality is extended to convey the green attributes associated with the respective nodes. The green attributes are then combined to form a green score.

According to certain non-limiting examples, the green score is calculated based on location information of the respective nodes and one or more environmental attributes associated with the nodes, and the label switched path (LSP) is calculated using the green score. For example, the location of a given node in the AS can be derived by augmenting Request for Comments (RFC) 5580, by Adrangi, F., et al., "Carrying Location Objects in RADIUS and Diameter," which is incorporated herein by reference in its entirety. The derived location is used during the green-score calculation. This information can be combined with a look-up table or map representing the carbon footprint and/or energy sustainability of electricity produced in different regions. Consider that, each country/location produces electricity in different ways. Some locations use more renewable resources to produce electricity while others rely more on fossil fuels to produce electricity. For each of nodes, the SR-PCE can pull the location and the power load factor of the router at a given node and multiply the power load factor by a $CO_2$ emission factor that corresponds to the location of the given node to calculate the green score for that given node. The green scores can be stored in a Topology Engineering Database (TED). According to certain non-limiting examples, the $CO_2$ emission values for respective locations can be derived from publicly available sources (e.g., https://app.electricitymaps.com/map). After calculating the green scores, the LSP can be calculated while taking into account the green scores. This approach can be used with a network that has Segment Routing (SR) with PCE.

The green score can be part of a larger analysis when determining the optimal route for traffic within and between ASs. For example, the analysis can include considerations such as loading balancing, throughput, bottlenecks in the network, packet latency across the network, security, hop count, and bandwidth of the respective nodes. The green score of the nodes along a given path can be combined to form a composite green score. For example, when the green score is proportional to the carbon footprint of processing the traffic at the respective nodes, the green scores of the nodes along a given path can be summed (i.e., the 1-norm of the path) to generate a value that is proportional to the total carbon footprint along that path. Other norms might also be used to calculate the cumulative green score of the path. For example, the n-norm is given by $$\sqrt[1/n]{\sum_{i=1}^{N} (g_i)^n},$$

where $g_i$ is the green score of the $i^{th}$ node in a path that includes N nodes. Thus, 0-norm returns a value that is one more than the hop count, and the 2-norm is the Euclidean distance of the green scores. The ∞-norm returns the largest green score in the given path.

For inter-AS communications, the eBGP protocol can be modified to account for the green score of the exit nodes.

Figure 4A:
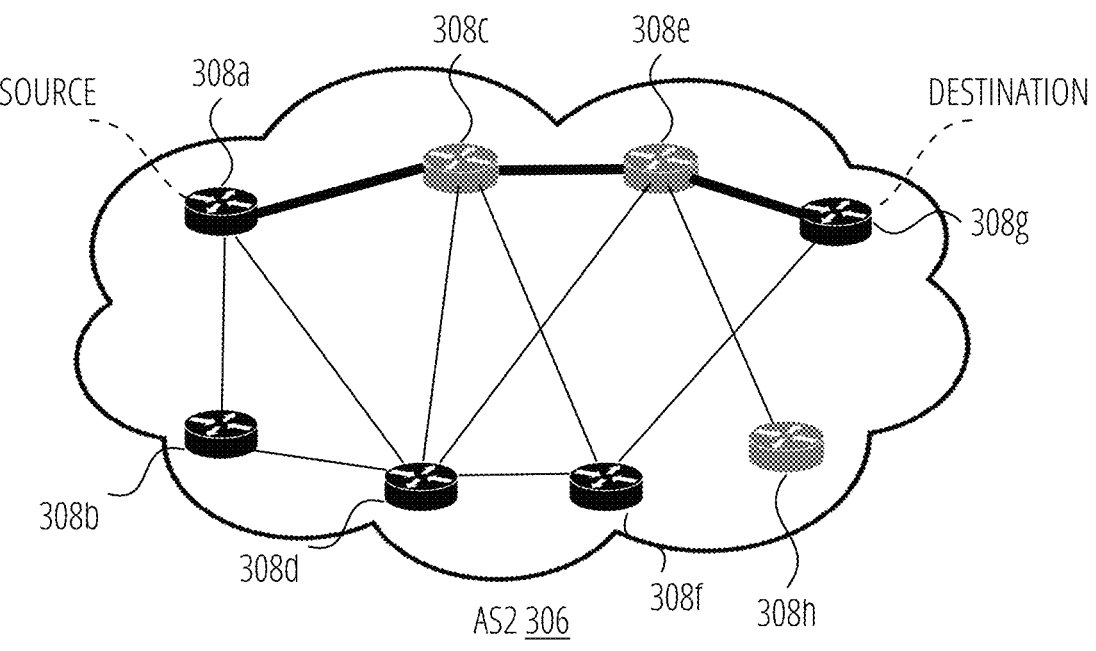
FIG. 4A illustrates an example of a first path from a source to a destination within an autonomous system, in accordance with some embodiments.
Figure 4B:
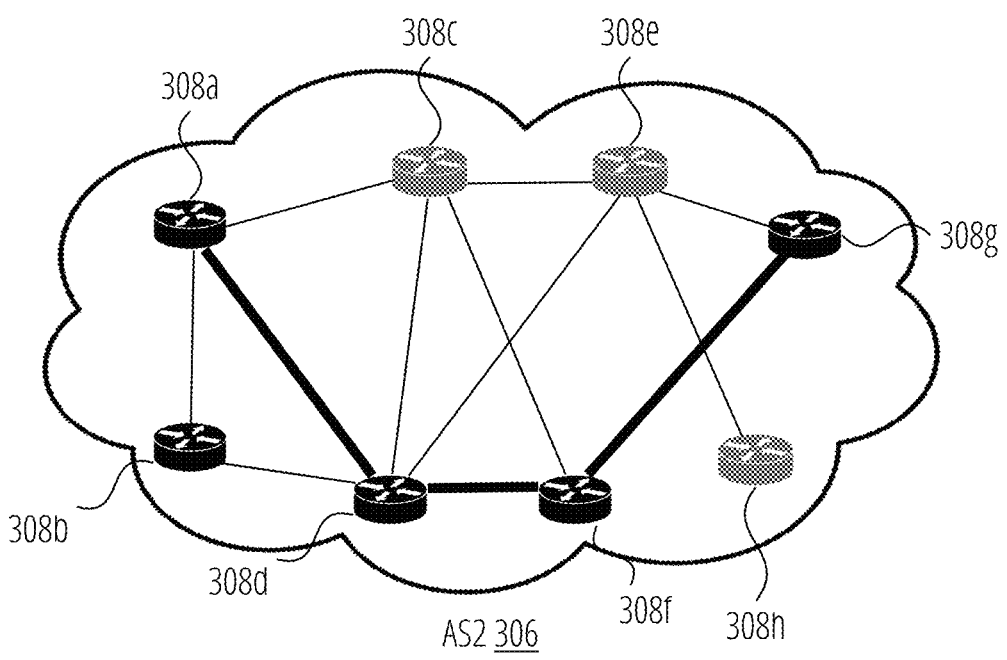
FIG. 4B illustrates an example of a second path from a source to a destination within an autonomous system, in accordance with some embodiments.

To illustrate an example of calculating the LSP consider the example illustrated in FIG. 4A and FIG. 4B, in which the source node of the data packets is node1 308a and the destination is node7 308g, FIG. 4A illustrates, using bold lines, a first of several possible 3-hop paths from node1 308a and the destination is node7 308g. This first path is represented as R1-R3-R5-R7 (i.e., from router R1 at node1 308a to router R3 at node3 308c to router R5 at node5 308e to router R7 at node7 308g).

FIG. 4B illustrates a second 3-hop paths from node1 308a and the destination is node7 308g. This second path is represented as R1-R4-R6-R7 (i.e., from router R1 at node1 308a to router R4 at node4 308d to router R6 at node6 308f to router R7 at node7 308g).

The first path (i.e., R1-R3-R5-R7) and the second (i.e., R1-R4-R6-R7) are examples of equal-cost multi-path (ECMP) routing. As discussed above, the black nodes (e.g., node1 308a, node2 308b, node4 308d, node6 308f, and node7 308g) have lower green scores relative to the grey nodes (e.g., node3 308c and node5 308e). Here, the convention is adopted that a lower value for the green score means better for the environment (e.g., represents lower $CO_2$ emissions), but this convention is non-limiting and other conventions could be adopted. Note there are other three-hop paths (e.g., R1-R3-R6-R7), but analyzing the first path and the second path is sufficient for illustrative purposes because it is straightforward to generalize the analysis to include other paths.

In FIG. 4A and FIG. 4B, node3 308c and node5 308e have greater values for their green score than the remaining nodes in AS2 306. Accordingly, based on the SR-PCE, ECMP paths that include both node3 308c and node5 308e are disfavored relative to paths that include only one of node3 308c or node5 308e, and ECMP paths that include only one of node3 308c or node5 308e paths are disfavored relative to paths that include neither node3 308c nor node5 308e.

The PCE will send the node and adjacency labels to the headend PCC (i.e., node1 308a) where the first path shown in FIG. 4A (i.e., R1-R3-R5-R7) is disfavored relative to the second path shown in FIG. 4B (i.e., R1-R4-R6-R7). So, traffic will be directed to take the second path (R1-R4-R6-R7), thereby excluding the nodes and links having the larger values for the green score.

For inter-AS communications, the eBGP protocol can be modified to account for the green score of the exit nodes. Often, inter-AS communication is performed using eBGP. The methods and systems disclosed herein modify the BGP protocol to improve the selection of the exit node and the link to a neighboring AS based on the green score. As discussed above, the BGP is modified to include as a path attribute to encode the green metric (which can be based on the green score of the nodes), and this path attribute is optional transitive.

According to certain non-limiting examples, the values for the green metric are encoded in the newly defined BGP path attribute and it will be exchanged between the Autonomous System Border Router (ASBR) in the BGP update messages.

According to certain non-limiting examples, an AS-level green score can also be calculated for the AS a whole, to aggregate the information from the green scores of the individual nodes in the AS. For example, the AS-level green score can be calculated based on the number of green nodes and links inside the AS, and whether a given node is green can be a binary determination by comparing the green score of the node to a green threshold. This AS-level green score can be used to select the upstream AS, so long as the AS path length is the same in the AS_PATH attribute.

According to certain non-limiting examples that include an SR-PCE network, the PCE can calculate the green score because the PCE has access to the location of the node and its carbon footprint value, power consumption, and other environmental parameters. Thus, the PCE can push the green score to the PCC (e.g., the ASBRs) via the PCEP. Once the ASBRs receive the green score it will be exchanged via BGP update messages.

According to certain non-limiting examples that include a traditional MPLS network without a central controller, the green score can be configured/assigned manually.

Figure 5:
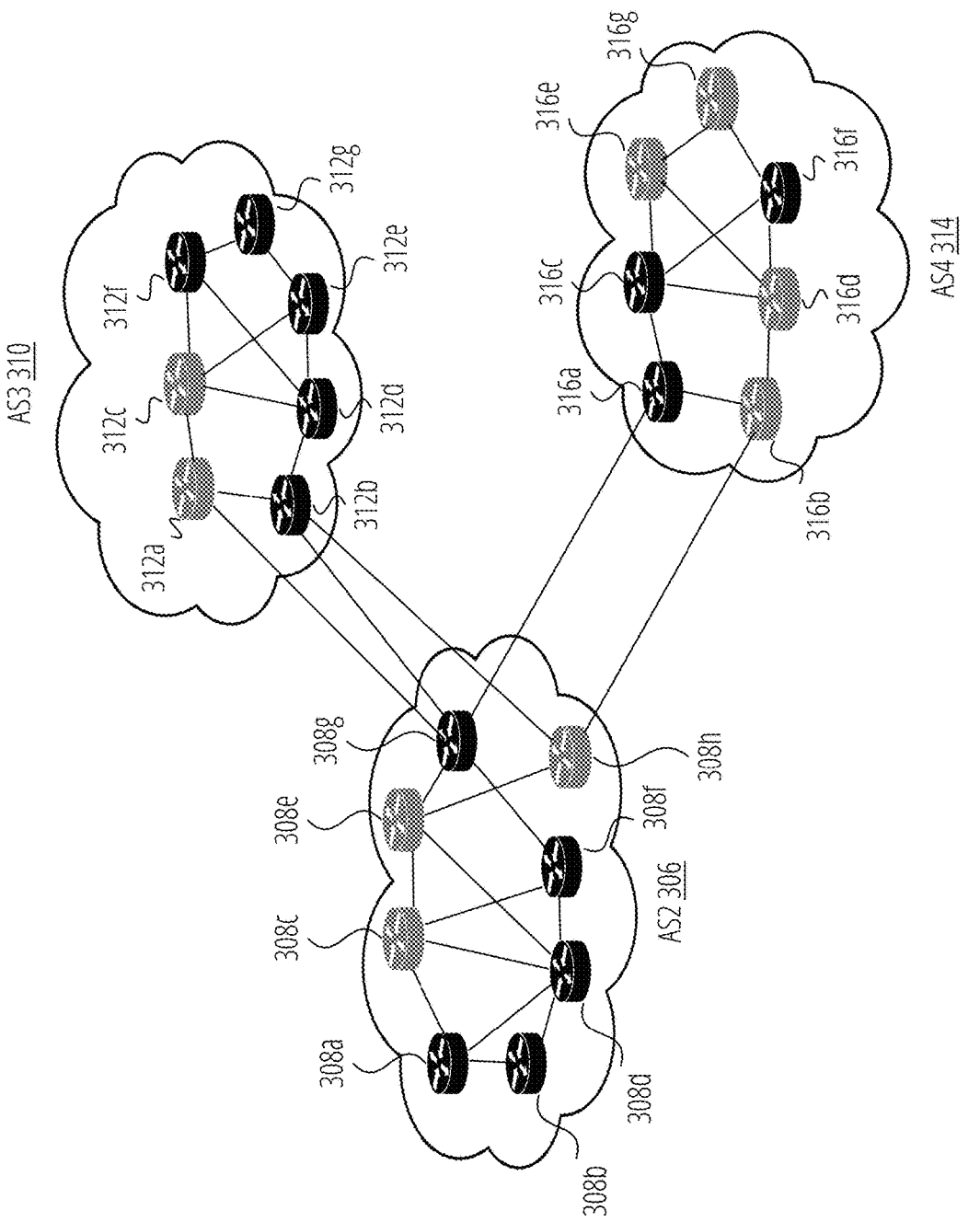
FIG. 5 illustrates an example of selecting exit nodes for routing traffic between autonomous systems, in accordance with some embodiments.

By way of illustration but no limitation, consider the illustrative example in FIG. 5 in which node7 308g in AS2 306 has a smaller value for the green score than does node8 308h in AS2 306. Therefore, when node7 308g receives prefixes from AS3 310 and AS4 314, a smaller green score value is assigned for those prefixes. Similarly, when node8 308h in AS2 306 receives prefixes from AS3 310 and AS4 314 a greater green score value is assigned for those prefixes. Thus, when AS2 306 sends traffic for those prefixes, node7 308g (i.e., the more green node) will be the preferred exit point.

Further, the methods and systems disclosed herein modify the BGP path selection algorithm to consider these green score values when determining traffic flows.

Alternatively, instead of modifying the BGP best path selection algorithm the green score can be directly incorporated into the BGP path selection algorithm by multiplying the existing weight attribute that is used in the path selection decision by a factor derived from the green score. Multiplying by this factor effectively places a thumb on the metaphorical path-selection scale to favor greener paths.

In addition to modifying the BGP protocol to select greener exit nodes, the green score can also be used to determine which ASs are greener and to direct network traffic through those greener ASs. In this case every AS can generate an AS-level green score and advertise the same in BGP update for optimal ecological path selection by neighboring AS peers.

According to certain non-limiting examples, the following process can be used to determine which ASs are greener than others and which ASs are selected for a route/path for data packets/network traffic. The AS-level green score can be validated by one or more regulated authorities like the Internet Assigned Numbers Authority (IANA) and the AS-level green score can be stored at a publicly available site (e.g., peeringdb.com). This authentication can help to ensure that the AS-level green score associated with a given AS is legitimate and thereby avoids false claims of exaggerated AS-level green score by operators. The authenticated AS-level green score can then be exchanged in the BGP update messages in the newly defined path attributes Type Length Value (TLV). For example, the TLV field can be formatted to include a type, which is green score, length, which can be 1 octet, and the value can range from 0 to 255. This TLV field can be used for conveying the green score for the IGP and the AS-level green score for the BGP.

As discussed above an AS-level green score is calculated. The AS-level green score can be calculated based on the number of green nodes within an AS, the percentage of green nodes within the AS, the average green score of the nodes within the AS. The determination of whether a node is "green" can be based on comparing the green score of the node with a green threshold, such that nodes are determined to be green when their green score is less than the green threshold. Further, the nodes can be classified into more than two levels of greenness. For example, nodes with green scores below a first green threshold can be classified as very green, whereas nodes with green scores above the first green threshold and below a second green threshold can be classified as somewhat green and nodes with green scores above the second green threshold are classified as not green.

According to certain non-limiting examples, a central controller in the respective AS can generate the AS-level green score for the AS as a whole. The AS-level green score can be calculated, e.g., based on parameters such as the number of green links, the number of green nodes, the geographical locations of the nodes, and/or how the power is generated in that particular geographical location.

Figure 6:
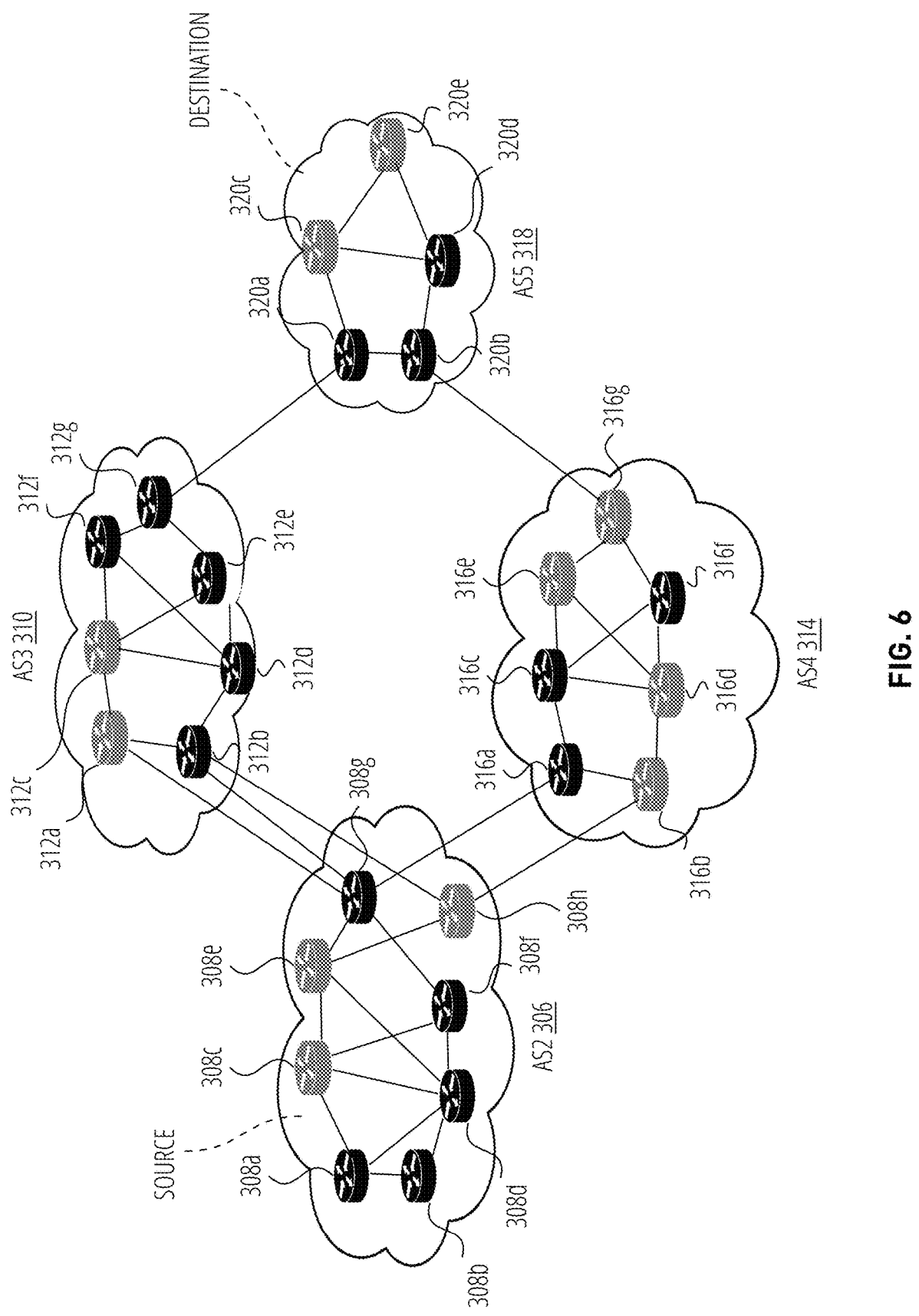
FIG. 6 illustrates an example of a selecting between alternatives for an intermediary autonomous system between a source autonomous system and a destination autonomous system, in accordance with some embodiments.

To illustrate the determination and use of the AS-level green score, consider the non-limiting example shown in FIG. 6 in which the network 300 includes a fifth AS (i.e., AS5 318) in addition to AS2 306, AS3 310, and AS4 314. AS5 318 includes five nodes: node1 320*a*, node2 320*b*, node 3 320*c*, node4 320*d*, and node5 320*e*.

When determining the AS-level green scores for AS3 310 and AS4 314, AS3 310 has a greater number of green nodes and has a higher percentage of green nodes. Here, by way of illustration and not limitation, the convention is adopted that the nodes depicted as black are green nodes, whereas the nodes depicted as grey are not. Thus, when the AS-level green score is based on either the number of green nodes or based on the percentage of green nodes. The AS-level green score of AS3 310 will be lower than that of AS4 314 (again the convention is that a lower score means better for the environment).

In the topology shown in FIG. 6, data packets going from AS2 306 to AS5 318 can have a prefix 200.1.1.0/24 (e.g., in the prefix beginning "N00" the "N" indicates the autonomous system "ASN"), and the packets can be routed through either AS3 310 or AS4 314. As discussed above, the AS-level green score of AS3 310 will be lower than that of AS4 314, and therefore AS3 310 is chosen by AS2 306 as a preferred path. According to certain non-limiting examples, this AS-level green score is considered only if the AS_Path length is same for the prefix, otherwise choosing the a path based on AS-level green scores may result in sub-optimal routing (e.g., by increasing the hop count). In this example, the AS_Path length through both AS3 310 and AS4 314 was selected to be the same. According to certain non-limiting examples, the methods and systems disclosed herein modify the BGP path selection algorithm to direct traffic through AS3 310 due to it having a lower/greener AS-level green score than AS4 314.

As discussed above, the AS-level green score can be authenticated by a regulation entity. The regulation entity can be a centralized authority or a decentralized regulator (e.g., a blockchain). According to certain non-limiting examples, the methods and systems disclosed herein can include a federated BGP attribute exchange process. For example, the federated BGP attribute exchange process can provide a mechanism to exchange specific attributes between different AS systems (e.g., attributes such as the AS-level green score). The federated exchange facilitates green packet routing by allowing different AS to share specific attributes (e.g., the AS-level green score, changes in $CO_2$ emission rates, changes in energy efficiency of routers, etc.). This exchange can also enable communication between the controllers of different domains (e.g., in the case of segment routing the exchanges can be SR-PCE).

According to certain non-limiting examples, the federated exchange can be realized using the following process. Specific AS-wide attributes are directly exchanged between the SR-PCE. For example, this can be performed using a new SR-PCE mode that interfaces with a federation. For example, the federation can be called "Exchange Interface SR-PCE". The SR-PCE can interact with the federation on behalf of the entire AS. Further, as any AS can advertise their AS-level green score, a validation process can be used to ensure that the SR-PCE is not misrepresenting the AS-level green score. The Federation can maintain and validate the AS-level green score for participating AS members. The federation can also assign a trust score to different AS using the Resource Public Key Infrastructure (RPKI).

FIG. 7 illustrates an example routine for using green scores to improve the environmental sustainability of route traffic between autonomous systems. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, in step 702 of method 700, the green scores are determined based on the green information. the green information can be pushed from the PCCs to the PCEs as discussed above. For example, the green score can be calculated based on green information that includes the locations of nodes, the energy efficiency of the router, and energy-production information (e.g., $CO_2$ emissions map).

According to some examples, in step 704 of method 700, the method includes determining the intra-AS route by pushing node and adjacency labels to the headend element. Further, step 704 includes analyzing candidate routes based on their corresponding green scores and possibly other considerations.

According to some examples, in step 706 of method 700, the method includes routing, for intra-AS traffic, data packets along the determined optimal path (e.g., optimal ecological path). For example, the green scores are used to select a path that minimizes (or maximizes, depending on whether the adopted convention is that a large value or a small value of the green score represents more environmentally favorable attributes at the node) a metric based on the green scores. As illustrated in FIG. 4A and FIG. 4B, a path/route can be selected based on which of the candidate routes has more green nodes.

According to certain non-limiting examples, the nodes are classified as either green or non-green based on a comparison to a threshold. For example, nodes having a value of the green score that is less than the threshold are classified as green, and nodes having green scores greater than the threshold are classified as non-green.

According to some examples, in step 708, method 700 includes applying green scores to determine preferred exit nodes for links between autonomous systems, and direct inter-AS communications along the preferred inter-AS links, as discussed above with reference to FIG. 5.

According to some examples, in step 710 of method 700, AS-level green scores are determined based on the green scores (i.e., node-level green scores). For example, the AS-level green score can be calculated as discussed above with reference to FIG. 5 and FIG. 6. Further, step 710 includes applying green scores to determine preferred autonomous systems, and direct inter-AS communications through the preferred autonomous systems.

Figure 8:
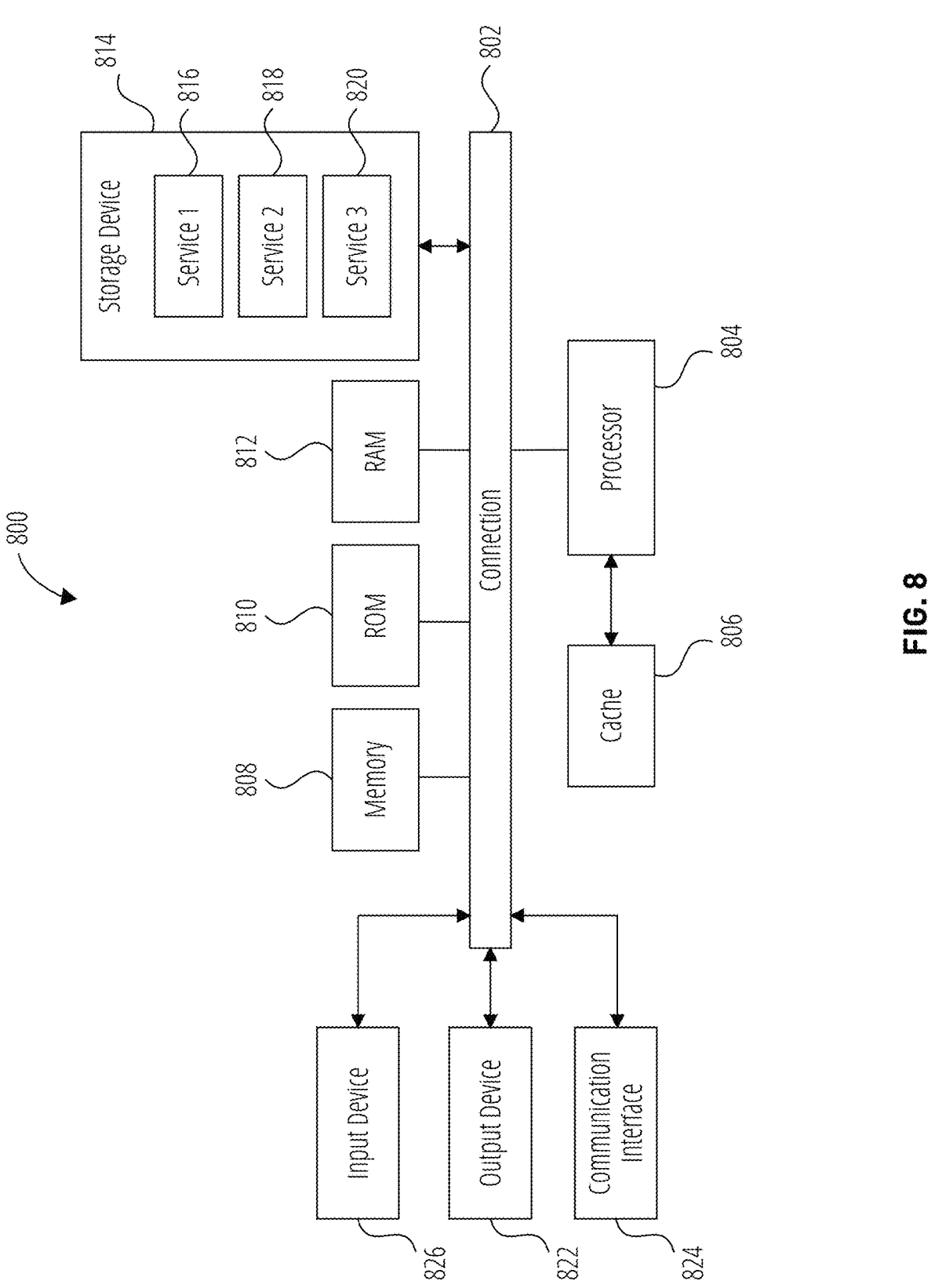
FIG. 8 illustrates an example of a computing system, in accordance with some embodiments.

FIG. 8 shows an example of computing system 800. The computing system 800 can be the nodes of the network (e.g., node 102, node 112, and node 114), the PCC, the PCE, the SR-PCE, the central controller, and routers within the network. The computing system 800 can perform the functions of one or more of method 700. The computing system 800 can be part of a distributed computing network in which several computers perform respective steps in method 700 and/or the functions of the network environment 100 or the network 300. The computing system 800 can be connected to the other parts of the distributed computing network via connection 802 or communication interface 824. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random access memory (RAM) 812 to processor 804. Computing system 800 can include a cache of high-speed memory 806 connected directly with, in close proximity to, or integrated as part of processor 804. Processor 804 may essentially be a completely self-contained computing system, containing multiple cores or processors, a bus, memory controller, cache, etc. A multi-core processor may be symmetric or asymmetric.

Processor 804 can include any general-purpose processor and a hardware service or software service, such as services 816, 818, and 820 stored in storage device 814, configured to control processor 804 as well as a special-purpose processor where software instructions are incorporated into the actual processor design.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include a communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer-readable media that can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the necessary hardware components, such processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a node or a central controller and performs one or more functions of method 700 when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data that cause or otherwise configure a general-purpose computer, special-purpose computer, or special-purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, For example, instructions and data which cause or otherwise configure a general purpose computer, special purpose computer, or special purpose processing device to perform a certain function or group of functions. Portions of computer resources used can be accessible over a network. The computer executable instructions may be, For example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of routing data traffic through a network, the method comprising:

assigning first-level green scores to respective nodes within one or more autonomous systems in a network, the first-level green scores being based in part on an environmental impact of energy production associated with locations of the respective nodes;

transmitting information on the nodes and adjacency labels of the nodes to a headend path computation client (PCC) within a first autonomous system of the one or more autonomous systems;

determining, for data packets, a label switched path (LSP) from a source node to a destination node within the first autonomous system, the LSP being determined based on the first-level green scores and the information on the nodes and adjacency labels; and routing the data packets from the source node to the destination node based on the LSP.

2. The method of claim 1, wherein the information on the nodes and adjacency labels are transmitted to the headend PCC from a central controller of the first autonomous system; and assigning the first-level green scores to the respective nodes within the first autonomous system comprises:

pulling, to the central controller, green information representing locations of the respective nodes of the first autonomous system, electrical energy consumption information of the respective nodes of the first autonomous system, and the environmental impact of energy production associated with the locations of the respective nodes of the first autonomous system, and calculating the first-level green scores corresponding to the respective nodes of the first autonomous system based on the green information associated with the respective nodes of the first autonomous system, wherein the central controller is a segment routing path computation element (SR-PCE), the SR-PCE performs a path computation element protocol (PCEP) between one or more path computation elements (PCEs) of the first autonomous system and one or more path computation clients (PCCs) corresponding to the respective nodes, the PCEP comprises carrying attributes of the one or more PCCs to the one or more PCEs, and the attributes comprise types or models of routers at the respective nodes, electrical power consumption of the respective nodes, and/or locations of the respective nodes.

3. The method of claim 1, further comprising:

retrieving a $CO_2$ emission factor from a database that indicates $CO_2$ emissions associated with electrical energy production as a function of location; and using the $CO_2$ emission factors corresponding to the locations of the respective nodes to determine the environmental impact of energy production associated with the locations of the respective nodes.

4. The method of claim 1, further comprising:

determining exit nodes for sending the data packets between pairs of one or more autonomous systems of the one or more autonomous systems based on the first-level green scores.

5. The method of claim 1, wherein the first-level green scores are encoded in a type-length-value (TLV) field of an interior gate protocol (IGP) to exchange the TLV field among the IGP nodes, and the TLV field for the first-level green scores includes a type of green score, a length of one octet and a value ranging between 0 and 255.

6. The method of claim 1, further comprising:

determining a second-level green score for each of the one or more autonomous systems, the second-level green score of a respective autonomous system of the one or more autonomous systems being based on the first-level green scores of the respective autonomous system; and advertising the second-level green score for each of the one or more autonomous systems to peer one or more autonomous systems.

7. The method of claim 6, wherein determining a second-level green score comprises:

pulling, to a segment routing path computation element (SR-PCE), green information of the respective nodes by:

performing, at the SR-PCE, a path computation element protocol (PCEP) between one or more path computation elements (PCEs) of the autonomous systems and one or more path computation clients (PCCs) corresponding to the respective nodes, wherein the PCEP comprises carrying attributes of the one or more PCCs to the one or more path computation elements (PCEs), and the attributes comprise types or models of routers at the respective nodes, electrical power consumption of the respective nodes, and/or locations of the respective nodes;

calculating the first-level green scores corresponding to the respective nodes based on the green information associated with the respective nodes;

calculating the second-level green score of an autonomous system of the one or more autonomous systems based on the first-level green scores of a set of nodes of the autonomous system;

transmitting the second-level green scores to autonomous system border routers (ASBRs) of the PCCs via the PCEP; and communicating the second-level green scores from the ASBRs to neighboring autonomous systems of the autonomous system via border gateway protocol (BGP) update messages.

8. The method of claim 6, further comprising:

authenticating, at the first autonomous system, a second-level green score advertised by a second autonomous system, the authentication being performed by:

communicating securely with a regulator to obtain information regarding an authenticity of the second-level green score advertised by the second autonomous system; and confirming that the second-level green score advertised by the second autonomous system can be used for routing decisions based on the obtained information from the regulator.

9. A computing apparatus comprising:

a processor; and a memory storing instructions that, when executed by the processor, configure the apparatus to:

assign first-level green scores to respective nodes within one or more autonomous systems in a network, the first-level green scores being based in part on an environmental impact of energy production associated with locations of the respective nodes;

transmit information on the nodes and adjacency labels of the nodes to a headend path computation client (PCC) within a first autonomous system of the one or more autonomous systems;

determine, for data packets, a label switched path (LSP) from a source node to a destination node within the first autonomous system, the LSP being determined based on the first-level green scores and the node and adjacency labels; and route the data packets from the source node to the destination node based on the LSP.

10. The computing apparatus of claim 9, wherein the information on the nodes and adjacency labels are transmitted to the headend PCC from a central controller of the first autonomous system; and assigning the first-level green scores to the respective nodes within the first autonomous system comprises:

pulling, to the central controller, green information representing locations of the respective nodes of the first autonomous system, electrical energy consumption information of the respective nodes of the first autonomous system, and the environmental impact of energy production associated with the locations of the respective nodes of the first autonomous system, and calculating the first-level green scores corresponding to the respective nodes of the first autonomous system based on the green information associated with the respective nodes of the first autonomous system, wherein the central controller is a segment routing path computation element (SR-PCE), the SR-PCE performs a path computation element protocol (PCEP) between one or more path computation elements (PCEs) of the first autonomous system and one or more path computation clients (PCCs) corresponding to the respective nodes, the PCEP comprises carrying attributes of the one or more PCCs to the one or more PCEs, and the attributes comprise types or models of routers at the respective nodes, electrical power consumption of the respective nodes, and/or locations of the respective nodes.

11. The computing apparatus of claim 9, wherein the stored instructions further configure the apparatus to:

retrieve a CO2 emission factor from a database that indicates CO2 emissions associated with electrical energy production as a function of location; and use the CO2 emission factors corresponding to the locations of the respective nodes to determine the environmental impact of energy production associated with the locations of the respective nodes.

12. The computing apparatus of claim 9, wherein the stored instructions further configure the apparatus to:

determine exit nodes for sending the data packets between pairs of one or more autonomous systems of the one or more autonomous systems based on the first-level green scores.

13. The computing apparatus of claim 9, wherein the stored instructions further configure the apparatus to:

determine a second-level green score for each of the one or more autonomous systems, the second-level green score of a respective autonomous system of the one or more autonomous systems being based on the first-level green scores of the respective autonomous system; and advertise the second-level green score for each of the one or more autonomous systems to peer one or more autonomous systems.

14. The computing apparatus of claim 13, wherein the stored instructions further configure the apparatus to determine the second-level green score by:

pulling, to a segment routing path computation element (SR-PCE), green information of the respective nodes by:

performing, at the SR-PCE, a path computation element protocol (PCEP) between one or more path computation elements (PCEs) of the autonomous systems and one or more path computation clients (PCCs) corresponding to the respective nodes, wherein the PCEP comprises carrying attributes of the one or more PCCs to the one or more path computation elements (PCEs), and the attributes comprise types or models of routers at the respective nodes, electrical power consumption of the respective nodes, and/or locations of the respective nodes;

calculating the first-level green scores corresponding to the respective nodes based on the green information associated with the respective nodes;

calculating the second-level green score of an autonomous system of the one or more autonomous systems based on the first-level green scores of a set of nodes of the autonomous system;

transmitting the second-level green scores to autonomous system border routers (ASBRs) of the PCCs via the PCEP; and communicating the second-level green scores from the ASBRs to neighboring autonomous systems of the autonomous system via border gateway protocol (BGP) update messages.

15. The computing apparatus of claim 13, wherein the stored instructions further configure the apparatus to:

authenticate, at the first autonomous system, a second-level green score advertised by a second autonomous system, the authentication being performed by:

communicating securely with a regulator to obtain information regarding an authenticity of the second-level green score advertised by the second autonomous system; and confirming that the second-level green score advertised by the second autonomous system can be used for routing decisions based on the obtained information from the regulator.

16. A non-transitory computer-readable storage medium, the computer-readable storage medium including instructions that when executed by a computer, cause the computer to:

assign first-level green scores to respective nodes within one or more autonomous systems in a network, the first-level green scores being based in part on an environmental impact of energy production associated with locations of the respective nodes;

transmit information on the nodes and adjacency labels of the nodes to a headend path computation client (PCC) within a first autonomous system of the one or more autonomous systems;

determine, for data packets, a label switched path (LSP) from a source node to a destination node within the first autonomous system, the LSP being determined based on the first-level green scores and the node and adjacency labels; and route the data packets from the source node to the destination node based on the LSP.

17. The non-transitory computer-readable storage medium of claim 16, wherein the instructions that are included on the computer computer-readable storage medium cause the computer to:

transmit the information on the nodes and adjacency labels to the headend PCC from a central controller of the first autonomous system; and assign the first-level green scores to the respective nodes within the first autonomous system by:

pulling, to the central controller, green information representing locations of the respective nodes of the first autonomous system, electrical energy consumption information of the respective nodes of the first autonomous system, and the environmental impact of energy production associated with the locations of the respective nodes of the first autonomous system, and calculating the first-level green scores corresponding to the respective nodes of the first autonomous system based on the green information associated with the respective nodes of the first autonomous system, wherein the central controller is a segment routing path computation element (SR-PCE), the SR-PCE performs a path computation element protocol (PCEP) between one or more path computation elements (PCEs) of the first autonomous system and one or more path computation clients (PCCs) corresponding to the respective nodes, the PCEP comprises carrying attributes of the one or more PCCs to the one or more PCEs, and the attributes comprise types or models of routers at the respective nodes, electrical power consumption of the respective nodes, and/or locations of the respective nodes.

18. The non-transitory computer-readable storage medium of claim 16, wherein the instructions that are included on the computer computer-readable storage medium cause the computer to:

determine a second-level green score for each of the one or more autonomous systems, the second-level green score of a respective autonomous system of the one or more autonomous systems being based on the first-level green scores of the respective autonomous system; and advertise the second-level green score for each of the one or more autonomous systems to peer one or more autonomous systems.

19. The non-transitory computer-readable storage medium of claim 18, wherein the instructions that are included on the computer computer-readable storage medium cause the computer to determine the second-level green score by:

pulling, to a segment routing path computation element (SR-PCE), green information of the respective nodes by:

performing, at the SR-PCE, a path computation element protocol (PCEP) between one or more path computation elements (PCEs) of the autonomous systems and one or more path computation clients (PCCs) corresponding to the respective nodes, wherein
the PCEP comprises carrying attributes of the one or more PCCs to the one or more path computation elements (PCEs), and
the attributes comprise types or models of routers at the respective nodes, electrical power consumption of the respective nodes, and/or locations of the respective nodes;
calculating the first-level green scores corresponding to the respective nodes based on the green information associated with the respective nodes;
calculating the second-level green score of an autonomous system of the one or more autonomous systems based on the first-level green scores of a set of nodes of the autonomous system;
transmitting the second-level green scores to autonomous system border routers (ASBRs) of the PCCs via the PCEP; and communicating the second-level green scores from the ASBRs to neighboring autonomous systems of the autonomous system via border gateway protocol (BGP) update messages.

20. The non-transitory computer-readable storage medium of claim 18, wherein the instructions that are included on the computer computer-readable storage medium cause the computer to:
authenticate, at the first autonomous system, a second-level green score advertised by a second autonomous system, the authentication being performed by:
communicating securely with a regulator to obtain information regarding an authenticity of the second-level green score advertised by the second autonomous system; and
confirming that the second-level green score advertised by the second autonomous system can be used for routing decisions based on the obtained information from the regulator.

* * * * *